United States Patent Office 3,841,995
Patented Oct. 15, 1974

3,841,995
TWO-ZONE HYDROGENATION PROCESS FOR THE PRODUCTION OF COLORLESS MINERAL OIL
Ralph J. Bertolacini, Chesterton, and Paul Donald Hopkins and Roland L. Menzl, Hammond, Ind., assignors to Standard Oil Company, Chicago, Ill.
No Drawing. Continuation-in-part of abandoned application Ser. No. 183,615, Sept. 24, 1971. This application June 12, 1973, Ser. No. 369,209
Int. Cl. C10g 23/04
U.S. Cl. 208—89                    10 Claims

ABSTRACT OF THE DISCLOSURE

A two-zone hydrogenation process produces a colorless mineral oil by hydrogenating and desulfurizing a lubricating oil distillate with a sulfactive hydrogenation catalyst in a first reaction zone and by contacting the first-reaction zone product in a second reaction zone with hydrogen and a catalyst containing a Group VIII noble metal deposited on a large-pore-diameter alumina at a temperature of 450–500° F., a hydrogen partial pressure of at least 500 p.s.i.g. and a LHSV of 0.25–1. The alumina has a surface area of 150–500 m.²/g. and an average pore diameter of 100–200 Angstroms. The lubricating oil distillate is initially dewaxed and may also be solvent-extracted to reduce its aromatic hydrocarbon content.

CROSS-REFERENCE TO RELATED APPLICATION

This application is a continuation-in-part application of co-pending application U.S. Ser. No. 183,615, filed on Sept. 24, 1971, now abandoned.

BACKGROUND OF THE INVENTION

In the past, lubricating oils and derivatives therefrom have been refined by employing a finishing treatment using clay or a combination of sulfuric acid and clay. In many cases, the feedstock had been dewaxed and/or solvent extracted. Such finishing treatments provided a treated product that possessed improved color and odor and, in many cases, improved stability to light and oxidation. In general, stability to oxidation and to light has been maintained by the addition of one or more chemicals to the finished product. In recent years, the quality of lubricating oils has been improved by a finishing treatment comprising a relatively severe hydrogenation treatment.

One of the important applications of hydrotreating a lubricating oil distillate is the hydrotreating of mineral oils to produce "white oils." A white oil is a highly refined lubricating oil fraction which has a colorless, water-white appearance. Such an oil must be colorless, odorless, and tasteless; and it must be essentially free of aromatic hydrocarbons. It must have a color of +30 Saybolt and must possess a low absorbence of ultraviolet light. Typical white oils may be used for cosmetics and certain medicinal purposes.

The hydrogenation treatment of a lubricating oil fraction to produce a white oil, in general, comprises a two-stage process. In the first stage of a typical process, the selected lubricating oil fraction is desulfurized over a sulfactive hydrogenation catalyst under relatively severe hydrogenation conditions, and the effluent from this first stage is contacted in a second stage with hydrogen under relatively mild conditions with a hydrogenation catalyst comprising a platinum group metal on a non-acidic or a weakly-acidic support.

Now there has been found an improved catalyst to be used in the second stage of such hydrofinishing processes. Moreover, it has been found that the process employing this improved catalyst provides superior white oils.

SUMMARY OF THE INVENTION

Broadly, according to the present invention, there is provided an improved catalytic composition for the hydrotreating of a petroleum hydrocarbon oil to produce a colorless mineral oil, which catalytic composition comprises a Group VIII noble metal deposited upon a large-pore-diameter alumina having a surface area of about 150 square meters per gram to about 500 square meters per gram and an average pore diameter of about 100 Angstrom units (A.) to about 200 A. The Group VIII noble metal may be present in an amount of about 0.1 weight percent to about 2 weight percent, based on the weight of the catalytic composition. The preferred Group VIII noble metal is palladium.

In addition, according to the present invention, there is provided a process for the production of a colorless mineral oil. This process comprises contacting a mineral lubricating oil distillate in a first reaction zone with a sulfactive hydrogenation catalyst in the presence of hydrogen and under hydrogenation and desulfurization conditions to produce a desulfurized product and contacting the desulfurized product in a second reaction zone with the catalytic composition of the present invention in the presence of hydrogen and under selected operating conditions.

DESCRIPTION OF THE INVENTION

According to the present invention, there is provided an improved catalytic composition for the hydrotreating of a mineral lubricating oil distillate to produce a colorless mineral oil. There is also provided a process for the production of a colorless mineral oil, which process employs as a catalyst the catalytic composition of the present invention.

The improved catalytic composition comprises a Group VIII noble metal deposited upon a large-pore-diameter alumina having a surface area of about 150 square meters per gram to about 500 square meters per gram and an average pore diameter of about 100 A. to about 200 A.

One of the components of the catalytic composition is a Group VIII noble metal. The Group VIII noble metals are palladium, platinum, rhodium, iridium, ruthenium, and osmium. The preferred Group VIII noble metal is palladium.

The other essential component of the improved catalytic composition of the present invention is a large-pore-diameter alumina. The average pore diameter of the alumina should be within the range of about 100 A. to about 200 A. Suitably, the average pore diameter should be at least 120 A. Preferably, the average pore diameter of the alumina that is employed in the catalytic composition of the present invention is at least 130 A. The surface area of this large-pore-diameter alumina should be within the range of about 150 square meters per gram to about 500 square meters per gram. Suitably, the surface area is at least 200 square meters per gram. Preferably, the surface area is at least 300 square meters per gram.

The catalytic composition of the present invention may also contain minor amounts of other components which do not adversely affect the performance of the catalyst for the hydrogenation and finishing of mineral lubricating oil distillates. An example of such a component is silica, which may be present in an amount of no more than 5 weight percent and which may provide a stabilizing effect upon the catalyst.

Suitable aluminas can be purchased from manufacturers of catalysts. For example, Nalco HF-type aluminas are available from the Nalco Chemical Company. These HF-type aluminas can be obtained with pore volumes varying from as low as 0.54 cc. per gram to as high as 2.36 cc. per gram and a corresponding average pore diameter within the range of about 72 A. to about 305 A.

A typical sample of Nalco HF-type alumina was found to have a surface area of 348 square meters per gram and an average pore diameter of about 112 A. Therefore, those Nalco HF-type aluminas which have the desired physical properties are suitable for use as the support of the catalytic composition of the present invention.

In addition, suitable aluminas can be obtained from the American Cyanamid Company. For example, a typical sample of American Cyanamid's Aero Extrudate 100, Sample No. 2234-2, was found to have a calculated average pore diameter of 138 A., a surface area of 238 square meters per gram, and a pore volume of 0.82 cc. per gram. It contained 6.2 weight percent volatiles, 0.3 weight percent silica, 0.03 weight percent sodium oxide, and 0.03 weight percent iron. The extrudates had an average length of 0.16 inch and a diameter of 0.064 inch.

The catalytic composition of the present invention may be prepared by several methods. The Group VIII noble metal may be added in the form of a soluble salt of that Group VIII noble metal to either a hydrosol or hydrogel of the alumina and the resulting composite subsequently blended, dried, and calcined. As an alternative, either extrudates or pellets of the alumina may be impregnated with an aqueous solution of the selected Group VIII noble metal. When the Group VIII noble metal is palladium, its salts may be any commercially-available salt or palladium metal solubilized by aqua regia. The impregnated composite may then be dried and calcined.

The Group VIII noble metal is present in an amount within the range of about 0.1 weight percent to about 2 weight percent, based on the weight of the catalytic composition. Preferably, no more than 1 weight percent of the Group VIII noble metal is employed.

According to the present invention, there is provided a process for the production of a colorless mineral oil. This process comprises contacting a mineral lubricating oil distillate in a first reaction zone with a sulfactive hydrogenation catalyst in the presence of hydrogen and under hydrogenation and desulfurization conditions to produce a desulfurized product and subsequently contacting said desulfurized product in a second reaction zone with the catalytic composition of the present invention in the presence of hydrogen and at a temperature of at least 450° F., a liquid hourly space velocity (LHSV) of about 0.25 to about 1 volume of hydrocarbon per hour per volume of catalyst, and a hydrogen addition rate of about 1,500 standard cubic feet of hydrogen per barrel of hydrocarbon (SCFB) to about 7.000 SCFB, and a hydrogen partial pressure of at least 500 p.s.i.g. The catalytic composition of the present invention, as described hereinabove, comprises a Group VIII noble metal deposited upon a large-pore-diameter alumina having a surface area of about 150 square meters per gram to about 500 square meters per gram and an average pore diameter of about 100 A. to about 200 A. The maximum temperature that is employed in the second reaction zone of this process is 500° F. and the maximum value of the hydrogen partial pressure in this second reaction zone is 2,500 p.s.i.g.

The catalyst that is employed in the first reaction zone of the process of the present invention is a sulfactive hydrogenation catalyst. Examples of such a catalyst are (1) a catalyst comprising nickel and molybdenum, either in the form of the elements or compounds thereof, deposited upon a non-acidic support or a weakly-acidic support, such as alumina, and (2) a catalyst comprising cobalt and molybdenum in the form of elements or as compounds thereof, deposited upon a non-acidic or weakly-acidic catalyst support material. It is contemplated, according to the present invention, that such sulfactive hydrogenation catalyst could comprise one or more of other Group VI and Group VIII metals, or their compounds, on selected non-acidic or weakly-acidic catalyst supports. Such supports include alumina, silica, and activated carbon.

The operating conditions that are employed in the first reaction zone of the process of the present invention comprise an elevated pressure of up to 5,000 p.s.i.g., a temperature of about 600° F. to 1,000° F., a LHSV as large as 5 volumes of hydrocarbon per hour per volume of catalyst and a hydrogen circulation rate as high as 25,000 SCFB.

Any mineral lubricating oil distillate may be treated in the process of the present invention. The feedstock might be a light lubricating oil, or it could be a heavy lubricating oil. The viscosity of the oil could have a value as low as about 40 Saybolt seconds at 100° F. On the other hand, the feedstock can have a viscosity as high as SAE 60. In general, the feedstock has been dewaxed and/or solvent extracted. In some cases, it may have been previously subjected to a mild hydrogenation treatment to reduce the amount of sulfur in the recycle gas and to help regulate the heat effect of a high aromatics content. Suitably, the solvent employed for solvent dewaxing is a mixture of an aromatic hydrocarbon and a ketone, e.g., a mixture of toluene and methyl-ethyl ketone. While the solvent-to-oil ratio used in solvent dewaxing may range from about 1:1 to about 4:1, a ratio of at least 2.4:1 is preferred. Solvents employed to preferentially dissolve aromatic hydrocarbons include phenols, furfurals, liquid $SO_2$, nitrobenzene, and dimethyl formamide.

The product that is obtained from the process of the present invention is a colorless water-white oil and has a color of +30 Saybolt and possesses a low absorbence of ultraviolet light. The UV analysis, pursuant to the Food and Drug Administration specification, can have a maximum value of 0.1. The product, when submitted to the test for readily carbonizable substances, which test is identified hereinbelow, can have a maximum USP-Acid Test value of 2.5.

In a preferred embodiment of the process of the present invention, a solvent extracted SAE-40 oil is contacted in a first reaction zone with a catalyst comprising about 2 weight percent nickel oxide and about 15 weight percent molybdenum trioxide on a catalytically active alumina. Hydrogen or hydrogen-containing gas is added to this first reaction zone and the operating conditions are such that desulfurization takes place. The effluent from this first reaction zone is separated into a liquid product and gaseous product, the latter of which contains any hydrogen sulfide and ammonia formed during the hydrogen treating in the first reaction zone. The desulfurized hydrocarbon stream, free of hydrogen sulfide and ammonia, is then passed into a second reaction zone and is contacted therein with a catalyst comprising 0.5 weight percent palladium supported on a large-pore-diameter alumina having a surface area of about 347 square meters pre gram and an average pore diameter of 112 A. The operating conditions in this second reaction zone comprise a temperature of about 475° F., a LHSV of about 0.25 to about 0.5 volume of hydrocarbon per hour per volume of catalyst, a hydrogen partial pressure of about 1,600 p.s.i.g., and a hydrogen circulation rate within the range of about 1,500 SCFB to about 7,000 SCFB. The effluent from the second reaction zone is treated to remove the liquid effluent from the gaseous material. The liquid effluent, that is, the refined mineral lubricating oil distillate, possesses a Saybolt color of +30, a USP Acid Test value that is no greater than 2.5, and a FDA-UV absorbence value that is no greater than 0.1.

The above preferred embodiment and the following examples are presented for purposes of illustration only and are not intended to limit the scope of the present invention.

EXAMPLE I

A typical embodiment of the catalytic composition of the present invention was prepared. A 4,4-gram portion of $(NH_3)_2Pd(NO_2)_2$ was dissolved in hot boiling aqua regia and evaporated to a dry residue. This residue was then re-dissolved in 5 ml. of concentrated nitric acid. Sufficient distilled water was added to make 500 ml. of solution, which was heated until the residue was completely dissolved. The resultant solution was then cooled to room temperature and was used to impregnate 500 grams of freshly calcined Cyanamid Aero 100 large-pro-diameter alumina. This alumina had been calcined in air at a temperature of about 1,000° F. for about 3 hours. The impregnated material was then dried in air at 250° F. for 3 hours and was calcined for 6 hours in air at a temperature of 1,000° F. The air flow rate employed during the drying and calcining was about 1.5 cubic feet per minute. The catalyst was prepared to contain about 0.5 weight percent palladium.

EXAMPLE II

Several mineral lubricating oil distillates were desulfurized over a catalyst comprising nickel and molybdenum compounds on alumina under relatively severe hydrogenation conditions. These feedstocks are identified hereinafter as Feed A, Feed B, Feed C, and Feed D. Feed A was a solvent-extracted, dewaxed SAE-10 oil; Feed B, a 1:3 blend of a mildly hydrofinished solvent-extracted, dewaxed SAE-40 oil and a solvent-extracted, dewaxed SAE-20 oil; Feed C, a solvent-extracted, dewaxed SAE-W oil; and Feed D, a distillate boiling in the range of 495° F. to 650° F.

The product that was obtained from each of these hydrogenation and desulfurization treatments was then individually hydrogenated in the presence of the catalytic composition that was prepared in Example I under the following hydrogenation conditions: a hydrogen partial pressure of 1,600 p.s.i.g., a LHSV of about 0.25 to about 0.5 volume of hydrocarbon per hour per volume of catalyst, a hydrogenation circulation rate of 1,500 SCFB to 7,000 SCFB, and a temperature within the range of 450° F. to 500° F. Therefore, each of the starting materials was hydrofinished according to the process of the present invention.

Each of the products was tested for carbonizable substances, color, presence of polynuclear compounds, and odor.

The test for carbonizable substances, identified as the USP Acid Test, is described in both the Regulations for Mineral Oil in the United States Pharmacopeia XVIII (1970), pp. 436–437, and the Regulations for light Mineral Oil in the National Formulary XIII (1970), pp. 461–462. This test was modified by measuring the color of the acid extract by the ASTM color method, rather than by comparing the color to the suggested standard color. The ASTM color method has ASTM designation D–1500–64 and IP designation 196/66. The approximate ASTM color value of the standard color referred to in USP Acid Test is 2.5. Therefore, to pass the test, the color of the acid extract could not be more than 2.5 ASTM.

The test for the presence of polynuclear compounds is identified as the FDA ultra-violet adsorption test and is described in paragraph 121.1146 of the FDA Regulations and is identical to the Limit of Polynuclear Compounds in the Regulations for Mineral Oil in the United States Pharmacopeia XVIII (1970), pp. 436–437. The absorbence of the standard was determined to be about 0.3. Therefore, to pass the test, the mineral oil must have a maximum absorbence of 0.1 in the 260 m$\mu$ to 350 m$\mu$ range.

The color of each petroleum product was tested pursuant to the ASTM Standard Method of Test for Saybolt Color of Petroleum Products, which method has ASTM Designation D–156–64 and is identified hereinafter as Saybolt Color.

The hydrofinished product must be colorless.

The Solid Paraffin Test is described in both the Regulations for Mineral Oil in the United States Pharmacopeia XVIII (1970), pp. 436–437, and the Regulations for Light Mineral Oil in the National Formulary XIII (1970), pp. 461–462.

The results of the various tests are presented hereinbelow in Table I. Please note that each of the products passed all requirements, with the exception of the product from Run No. 2, which product failed the Solid Paraffin Test. This was the result of the high wax content of that particular feed.

TABLE I.—PROPERTIES OF PRODUCTS

| Run number | 1 | 2 | 3 | 4 |
|---|---|---|---|---|
| Feed | A | B | C | D |
| Color, Saybolt | +30 | +30 | +30 | +30 |
| Carbonizable substances, USP | Pass | Pass | Pass | Pass |
| Odor | do | do | do | Pass |
| UV absorbence (260–300 m$\mu$) | 0.02 | 0.01 | | |
| Unsulfonated residue, percent | 99.0 | 98.4 | | 100.0 |
| Solid paraffin, U.S.P | Pass | Fail | Pass | |

EXAMPLE III

A catalyst containing a typical prior-art aluminum having smaller pore diameters was prepared. A 5-pound batch of Grade 90 alumina was blended with a sufficient amount of distilled water to provide an alumina slurry which had a water content of 41 percent. This alumina, prior to blending, was in a finely divided state and was capable of passing through a 250-mesh screen (U.S. Series). It was obtained from the Filtrol Corporation. The resulting blend was extruded, dried in air at a temperature of about 250° F., and calcined in air for three hours at a temperature of 1,000° F. The finished alumina was in the form of $\frac{1}{16}$-inch extrudates.

A 696-gram portion of these $\frac{1}{16}$-inch extrudates was impregnated with an aqueous solution prepared by dissolving 7.6 grams of Pd(NO$_3$)$_2$ in 674 millilters of distilled water containing five milliliters of concentrated nitric acid. The impregnated material was dried in air overnight at a temperature of approximately 250° F. and was calcined subsequently in air for three hours at a temperature of 1,000° F.

This catalyst, which was prepared to contain 0.5 weight percent palladium, is hereinafter identified as Catalyst B. The finished catalyst was found to have a surface area of 225 square meters per gram, a pore volume of 0.47 cc./gram, and a calculated average-pore-diameter of 84 A.

EXAMPLE IV

An embodiment of the catalytic composition of the present invention was prepared by the American Cyanamid Company. This catalyst was manufactured by using Cyanamid Aero 100 large-pore-diameter alumina. The finished catalyst contained 0.49 weight percent palladium and had a surface area of 240 square meters per gram, a pore volume of 0.82 cc./gram, and a calculated average-pore-diameter of 137 A. This catalyst is hereinafter identified as Catalyst C.

EXAMPLE V

This example was designed to demonstrate the improved presently-disclosed process for hydrotreating a mineral lubricating oil distillate over a process comprising two stages and employing as the catalyst in the second stage a catalyst comprising alumina having a smaller-pore-diameter alumina.

A two-stage hydrogenation process was simulated in each of these tests. In each instance, the first stage comprised hydrotreating solvent-extracted dewaxed SAE–20 oils and solvent-extracted, dewaxed and, in some cases, mildly hydrofinished SAE–40 oils in a first reactor under relatively severe hydrogenation conditions in the presence of a commercial sulfactive hydrotreating catalyst. This catalyst was a commercial Cyanamid HDS–3A catalyst comprising nickel and molybdenum on $\frac{1}{16}$-inch extruded alumina.

The solvent-extracted hydrocarbon stream was mixed with hydrogen and the mixture was introduced into the top of the reactor and was permitted to pass down through the catalyst bed. The reactor was held in the unit in a heating block that was electrically heated. The effluent was cooled and passed through a Jerguson separator and stripping column. The liquid effluent from this first reactor was composited and the resulting composite was found to have a gravity at 60° F. of 31.5° API, a viscosity at 100° F. of 300 SUS, a sulfur level of 3 p.p.m. a Saybolt color of +20, a FDA UV Test value of 2.82, and a USP Acid Test value that was greater than 8 ASTM. This severely hydrogenated hydrocarbon stream constituted the intermediate product in the simulated two-stage processes of this example. This intermediate product had a low sulfur level and a relatively low aromatic content and was subsequently employed as the feed to the second stage of each of the two-stage processes.

For the first stage of each process of this example, 600 cc. of catalyst were employed. The reactor was fabricated from a stainless steel pipe having an inside diameter of 1.5 inches. The catalyst was supported by a layer of 6-mm. glass beads on a 10-mesh stainless steel screen. The screen was located 4¼ inches from the bottom of the reactor. The screen and layer of beads occupied approximately 9/16-inch of the reactor length. The catalyst bed occupied approximately 20¾ inches of the reactor length. The space in the reactor above the catalyst bed contained 6-mm. glass beads to within an inch of the top closure.

The catalyst in this first-stage reactor was sulfided by passing a mixture of eight volume percent hydrogen sulfide and 92 volume percent hydrogen over the catalyst for 2 hours at a temperature of 400° F. The temperature was then raised to 700° F. over a period of 1 hour and the sulfiding was continued for several more hours. The flow rate of the hydrogen sulfide-hydrogen gas mixture was approximately 1 cubic foot per hour per pound of catalyst.

For the second stage of each process tested in this example, the intermediate product, that is, the liquid effluent from the first stage, was mixed with hydrogen and the resulting mixture was introduced into the top of the second-stage reactor. This reactor may be described as a reactor identical to that employed in the first stage. However, only 400 cc. of catalyst were employed in the second-stage reactor and the length of the reactor bed was approximately 14 inches. The effluent from the reactor was cooled and passed sequentially through a Jerguson separator and then to a stripping column. The product obtained from the stripper was collected in a nitrogen-blanketed product receiver.

The operating conditions in the second-stage reactor for Catalyst B included a temperature of 475° F., a hydrogen partial pressure of 1,600 p.s.i.g. a LHSV of 0.25 volume of hydrocarbon per hour per volume of catalyst, and a hydrogen-addition rate of 6,400 SCFB. The operating conditions employed in the second reactor for Catalyst C included a temperature of 475° F., a hydrogen partial pressure of 1,600 p.s.i.g., a LHSV of 0.27 volume of hydrocarbon per hour per volume of catalyst, and a hydrogen-addition rate of 6,000 SCFB.

Once-through hydrogen was employed for each stage of each of these processes.

Various tests were performed on the liquid products obtained from the second stage of each of these two processes. The results of these tests are presented in Table II hereinbelow. It was found that the products obtained from the process employing Catalyst B as the second-stage catalyst contained traces of catalyst fines. Therefore, these products were filtered through a 1.2 μ "millipore" filter. The USP Acid Test value is provided for each of these products prior to and subsequent to the filtering treatment.

TABLE II.—PROPERTIES OF PRODUCTS

| 2nd-stage catalyst | B | B | B | C | C | C |
|---|---|---|---|---|---|---|
| Time on stream, hrs | 21–45 | 45–69 | 69–93 | 12–24 | 24–51 | 51–75 |
| USP Acid Test | 3–3.5 | 3–3.5 | 3–3.5 | 0.5–1 | 0.5–1 | 0–0.5 |
| USP Acid Test (filtered product) | 3–3.5 | 2.5–3 | 3.5–4 | | | |
| FDA-UV absorbence (260–350 mμ) | 0.040 | 0.060 | 0.030 | 0.030 | 0.040 | 0.035 |
| Color, Saybolt | +30 | +30 | +30 | +30 | +30 | +30 |

These data indicate that a product that was obtained from the embodiment of the process of the present invention provided a USP Acid Test value which was superior to that obtained from the process employing Catalyst B as the second-stage catalyst. In fact, the USP Acid Test values obtained with the product of this latter process appear, in general, not to pass the specification. It may be concluded from the results obtained in this example that the embodiment of the process of the present invention, that is, the process employing Catalyst C, provides an improved product relative to the product obtained from the process employing Catalyst B as the second-stage catalyst, a typical two-stage hydrogenation process.

EXAMPLE VI

In this example, a mineral lubricating oil distillate that had been dewaxed and hydrogenated, but not solvent-extracted, was treated by an embodiment of the process of the present invention. The preliminary hydrogenation was a mild hydrogenation treatment conducted over an American Cyanamid Company commercial catalyst HDS–2A at a hydrogen partial pressure of 800 p.s.i.g., a temperature of 625° F. to 690° F., a LHSV of 0.5 volume of hydrocarbons per hour per volume of catalyst, and a once-through-hydrogen rate of about 800 SCFB. This mildly hydrotreated feedstock was found to have a gravity of 29.7° API, a viscosity at 100° F. of 58 SUS, a viscosity at 210° F. of 34.5 SUS, and a sulfur level of 0.3 weight percent.

The test was carried out in the equipment and the manner described in Example V hereinabove. The first-stage catalyst was the same type of catalyst that was employed in the first stage of Example V, i.e., a commercial American Cyanamid Company HDS–3A catalyst comprising nickel and molybdenum on 1/16-inch extruded alumina. A 600-cc. portion of this catalyst was used. The catalyst employed in the second stage was a 400-cc. portion of Catalyst C, described in Example IV hereinabove.

The operating conditions employed in the first stage comprised a temperature of 700° F., a hydrogen partial pressure of 3,000 p.s.i.g., a LHSV of 0.28 volume of hydrocarbons per hour per volume of catalyst, and a hydrogen-addition rate of about 5,800 SCFB. The operating conditions employed in the second stage comprised a temperature of 475° F., a hydrogen partial pressure of 1,600 p.s.i.g., a LHSV of 0.25 volume of hydrocarbons per hour per volume of catalyst, and a hydrogen-addition rate of about 6,800 SCFB.

The product obtained from this test was found to have a Saybolt Color Value of +30, a UV Absorbence (260–350 mμ) of 0.03, a gravity of 35.5° API, a viscosity at 100° F. of 55.6 SUS, a viscosity at 210° F. of 34.3 SUS, a value from the USP Acid Test (carbonizable substances) of 1 to 1½, and an unsulfonated residue of 99%. Unfortunately, an odor test was not made on the product at the time of the test. However, over two years later, the material was tested for odor and did not pass the test. The material could be conveniently percolated over clay to correct the odor problem.

This test demonstrates that a hydrocarbon stream, depending on its composition, need not be solvent extracted prior to being treated by the process of the present invention.

What is claimed is:

1. A process for the production of a colorless mineral oil, which process comprises contacting a dewaxed mineral lubricating oil distillate or a dewaxed and solvent-extracted mineral lubricating oil distillate of reduced aromatic hydrocarbon content in a first reaction zone with a sulfactive hydrogenation catalyst in the presence of hydrogen and under hydrogenation an desulfurization conditions to produce a hydrogenated and desulfurized product; contacting said hydrogenated and desulfurized product in a second reaction zone with a second catalyst comprising a Group VIII noble metal deposited upon a large-pore-diameter alumina having a surface area of about 150 square meters per gram to about 500 square meters per gram and an average pore diameter of about 100 A. to about 200 A. in the presence of hydrogen and at a temperature of at least 450° F., a LHSV of about 0.25 to about 1 volume of hydrocarbon per hour per volume of catalyst, a hydrogen addition rate of about 1,500 SCFB to about 7,000 SCFB, and a hydrogen partial pressure of at least 500 p.s.i.g., said temperature in said second reaction zone having a maximum value of 500° F.; and recovering said colorless mineral oil from the effluent from said second reaction zone.

2. The process of Claim 1 wherein said Group VIII noble metal of said second catalyst is present in an amount of about 0.1 weight percent to about 2 weight percent, based on the weight of said second catalyst.

3. The process of Claim 1 wherein said Group VIII noble metal of said second catalyst is palladium.

4. The process of Claim 1 wherein the mineral lubricating oil distillate being contacted in said first reaction zone is a dewaxed and solvent-extracted mineral lubricating oil distillate of reduced aromatic hydrocarbon content.

5. The process of Claim 2 wherein said Group VIII noble metal of said second catalyst is palladium.

6. The process of Claim 4 wherein said Group VIII noble metal of said second catalyst is present in an amount of about 0.1 weight percent to about 2 weight percent, based on the weight of said second catalyst.

7. The process of Claim 4 wherein said Group VIII noble metal of said second catalyst is palladium.

8. The process of claim 5 wherein the maximum value of said pressure is 2,500 p.s.i.g.

9. The process of Claim 7 wherein said palladium in said second catalyst is present in an amount of about 0.1 weight percent to about 2 weight percent, based on the weight of said second catalyst.

10. The process of Claim 9 wherein the maximum value of said pressure is 2,500 p.s.i.g.

References Cited
UNITED STATES PATENTS

| | | | |
|---|---|---|---|
| 3,340,181 | 9/1967 | Diringer et al. | 208—210 |
| 3,340,183 | 9/1967 | Egan | 208—210 |
| 3,393,148 | 7/1968 | Bertolacini et al. | 208—264 |
| 3,459,656 | 8/1969 | Rausch | 208—89 |
| 3,486,993 | 12/1969 | Egan et al. | 208—89 |
| 3,487,005 | 12/1969 | Egan et al. | 208—89 |
| 3,551,325 | 12/1970 | Rausch | 208—89 |
| 3,629,096 | 12/1971 | Divijak, Jr. | 208—210 |
| Re. 27,845 | 12/1973 | Gilbert et al. | 208—89 |
| 3,673,078 | 6/1972 | Kirk, Jr. | 208—89 |

DELBERT E. GANTZ, Primary Examiner

G. J. CRASANAKIS, Assistant Examiner

U.S. Cl. X.R.

208—210, 264

PO-1050
(5/69)

UNITED STATES PATENT OFFICE
CERTIFICATE OF CORRECTION

Patent No. 3,841,995            Dated October 15, 1974

Inventor(s) Ralph J. Bertolacini, Paul Donald Hopkins and Roland L. Menzl

It is certified that error appears in the above-identified patent and that said Letters Patent are hereby corrected as shown below:

Column 5, line 22, "SAE-W" should be -- SAE-5W --.

Column 6, line 15, "aluminum" should be -- alumina --.

Column 8, line 72, "an" should be -- and --.

Signed and sealed this 15th day of April 1975.

(SEAL)
Attest:

RUTH C. MASON
Attesting Officer

C. MARSHALL DANN
Commissioner of Patents
and Trademarks